(12) United States Patent
Keesling (10) Patent No.: US 11,132,057 B2
(45) Date of Patent: *Sep. 28, 2021

(54) USE OF LIGHT TRANSMISSION THROUGH TISSUE TO DETECT FORCE

(71) Applicant: Applied Invention, LLC, Burbank, CA (US)

(72) Inventor: Michael Keesling, Agoura Hills, CA (US)

(73) Assignee: APPLIED INVENTION, LLC, Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/739,530

(22) Filed: Jan. 10, 2020

(65) Prior Publication Data

US 2020/0150762 A1    May 14, 2020

Related U.S. Application Data

(63) Continuation of application No. 16/417,503, filed on May 20, 2019, now Pat. No. 10,551,919, which is a continuation of application No. 14/966,489, filed on Dec. 11, 2015, now Pat. No. 10,296,087, which is a continuation of application No. 14/076,162, filed on Nov. 8, 2013, now Pat. No. 9,239,619.

(51) Int. Cl.
*G06F 3/01*    (2006.01)
*G06F 3/03*    (2006.01)
*G01B 11/16*   (2006.01)

(52) U.S. Cl.
CPC .............. *G06F 3/014* (2013.01); *G01B 11/16* (2013.01); *G06F 3/017* (2013.01); *G06F 3/0304* (2013.01); *G06F 3/0325* (2013.01)

(58) Field of Classification Search
CPC ........ G06F 3/014; G06F 3/0304; G06F 3/017; G06F 3/0325; G01B 11/16
See application file for complete search history.

(56) References Cited

U.S. PATENT DOCUMENTS

| 4,846,189 | A  | 7/1989  | Sun           |
|-----------|----|---------|---------------|
| 5,045,683 | A  | 9/1991  | Kanda         |
| 5,379,774 | A  | 1/1995  | Nishimura et al. |
| 9,239,619 | B2 | 1/2016  | Keesling      |
| 10,296,087 | B2 | 5/2019  | Keesling      |
| 2001/0025917 | A1 | 10/2001 | Asada et al.  |

(Continued)

*Primary Examiner* — Premal R Patel
(74) *Attorney, Agent, or Firm* — Perkins Coie LLP; Alberto Araiza (57) ABSTRACT

Various embodiments relate to apparatuses and methods that can determine an amount of force on a tissue. An apparatus can include an optical fiber including a first end and a second end. An electronics module of the apparatus is coupled to the first end of the optical fiber. The electronics module can include a light emitter that can transmit light to the tissue over the optical fiber and a light sensor that can receive light over the optical fiber. The received light includes a component of the transmitted light reflected by the tissue. The electronics module can include a processor that can determine the amount of force on the tissue based on characteristic(s) of the reflected light. The apparatus can also include an end cap coupled to the second end of the optical fiber. The end cap can introduce the transmitted light into the tissue and receive the reflected light.

20 Claims, 7 Drawing Sheets

(56) References Cited

U.S. PATENT DOCUMENTS

| | | |
|---|---|---|
| 2002/0198443 A1 | 12/2002 | Ting |
| 2006/0012567 A1* | 1/2006 | Sicklinger ............... G06F 3/014 345/157 |
| 2006/0022936 A1 | 2/2006 | Liang |
| 2007/0073117 A1 | 3/2007 | Raridan, Jr. |
| 2008/0091121 A1 | 4/2008 | Sun et al. |
| 2008/0188724 A1 | 8/2008 | Hwang et al. |
| 2011/0105918 A1 | 5/2011 | Fortin et al. |
| 2013/0035562 A1 | 2/2013 | Besko |
| 2013/0160558 A1 | 6/2013 | Oishi |
| 2013/0197399 A1* | 8/2013 | Montgomery ....... A61B 5/1125 600/595 |
| 2013/0289366 A1 | 10/2013 | Chua et al. |
| 2013/0296714 A1 | 11/2013 | Kassim et al. |
| 2014/0121536 A1 | 5/2014 | LaFarge |
| 2014/0121563 A1* | 5/2014 | LaFarge ............... A61B 5/6806 600/587 |
| 2014/0213884 A1 | 7/2014 | Hirabara et al. |
| 2015/0130697 A1 | 5/2015 | Keesling |
| 2016/0098083 A1 | 4/2016 | Keesling |

\* cited by examiner

USE OF LIGHT TRANSMISSION THROUGH TISSUE TO DETECT FORCE

CROSS-REFERENCE TO RELATED APPLICATIONS

This application is a continuation of U.S. patent application Ser. No. 16/417,503, filed May 20, 2019, and entitled "Use of Light Transmission Through Tissue to Detect Force", which is a continuation of U.S. patent application Ser. No. 14/966,489, filed Dec. 11, 2015, now U.S. Pat. No. 10,296,087, issued on May 21, 2019, and entitled "Use of Light Transmission Through Tissue to Detect Force", which is a continuation of U.S. patent application Ser. No. 14/076,162, filed Nov. 8, 2013, now U.S. Pat. No. 9,239,619, issued Jan. 19, 2016, and entitled "Use of Light Transmission Through Tissue to Detect Force", which is related to U.S. patent application Ser. No. 14/076,160, filed on Nov. 8, 2013, now U.S. Pat. No. 9,743,860, issued Aug. 29, 2017, and entitled "Use of Light Transmission Through Tissue to Sense Joint Flexure", each of which are hereby incorporated by reference for all purposes in their entirety.

STATEMENT OF GOVERNMENT RIGHTS

This invention was made with Government support under Contract No. GS00009BGD0013/GST0810BP0059 awarded by the U.S. Air Force. The United States Government may have certain rights in the invention.

FIELD OF TECHNOLOGY

The present disclosure relates to detecting force applied to a surface by living tissue such as a human finger and the use of light transmission and reception through living tissue.

BACKGROUND

Data gloves are computer interface devices which characterize the pose and configuration of a human hand. This enables gesture recognition, motion capture, robotic control, data entry, and other functions. For example, a user can operate a computer or other device by making gestures without physical contact.

When a user is wearing a data glove, it is desirable to be able to perform the equivalent of "clicking a button" to perform an action. This is typically achieved by pressing a force-sensing device mounted on the inner fingertip against any surface. However, this method has a number of disadvantages. The sensor is between the fingertip and the surface, leading to loss of touch sense to the user. A sensor located on a fingertip is more exposed to impact and damage. It is desirable to be able to sense force applied without interposing a sensor between the user's fingertip and a surface.

It will be noted that, in the medical field, a number of sensors analyze red and infrared light transmitted through fingertips to measure blood oxygenation (pulse oximetry), pulse, and other parameters.

SUMMARY

The transmission of light through living tissue, such as a finger, is affected by how much the tissue is compressed. The tissue of the finger may be compressed by, for example, being pressed onto a surface. This change in light transmission may be used as an indirect way to measure how much force is being applied to the surface by the finger. One advantageous aspect of this technology is that it enables the determination of when a user is performing the equivalent of "clicking a button" without impacting the user's sense of touch. Another advantageous aspect is that it does not subject a sensor to the impact and damage of being pressed against a surface by a finger.

The disclosed technology enables the determination of an amount of force applied by living tissue to a surface. Some embodiments include a light source, a light sensing device, a processing device, and a supporting object. Light from the light source is introduced into the living tissue. The light sensing device is configured to sense the light after exiting the living tissue. The processing device is configured to determine the amount of force applied by the living tissue to a surface based at least in part on one or more characteristics of the light after exiting the living tissue. The supporting object is to provide mechanical support for at least a portion of the apparatus. In some embodiments, the apparatus further comprises a first optical fiber and a second optical fiber. The first optical fiber is configured to send the light from the light source to a point of introduction of the light into the living tissue. The second optical fiber is configured to send the light from a point of exit of the light from the living tissue to the light sensing device.

In some embodiments, the supporting object is a glove configured to be worn by a human hand and the living tissue comprises the human hand. The portion of the apparatus for which the glove provides the mechanical support is at least the first optical fiber and the second optical fiber. In some embodiments, the light source is configured to be located at a point of introduction of the light into the living tissue, and the light sensing device is configured to be located at a point of exit of the light from the living tissue. In some embodiments, the supporting object is a glove configured to be worn by a human hand, and the living tissue comprises the human hand The portion of the apparatus for which the glove is configured to provide the mechanical support is at least the light source and the light sensing device.

In some embodiments, the supporting object is a finger glove configured to be worn on a human finger and the living tissue comprises the human finger. In some embodiments, when the living tissue comprises a human finger, the light source and the light sensing device are located above a fingernail of the finger. In some embodiments, the one or more characteristics include an intensity of the light after exiting the living tissue. In some embodiments, the light source is a light-emitting diode. In some embodiments, the light source is an infrared-spectrum light-emitting diode. In some embodiments the light sensing device senses infrared-spectrum light.

An amount of force applied by living tissue to a surface can be determined using a method. Light can be introduced into the living tissue and can be received after exiting the living tissue. An amount of force applied by the living tissue to a surface can be determined based at least in part on one or more characteristics of the received light. In some embodiments, the light introduced into the living tissue is generated by a light source and the light, after exiting the living tissue, is received by a light sensing device. In some embodiments, the light introduced into the living tissue is sent from the light source to a point of introduction of the light into the living tissue by a first optical fiber, and the light received by the light sensing device is sent from a point of exit of the light from the living tissue to the light sensing device by a second optical fiber.

The method for determining an amount of force applied by living tissue to a surface can further comprise calibration of an apparatus based at least in part on the one or more characteristics of the light after exiting the living tissue. In some embodiments, the one or more characteristics include an intensity of the light. In some embodiments, calibration can further comprise sensing a first light level while an appendage is in an uncompressed state, sensing a second light level while the appendage is in a compressed state, and computing a correlation between an amount of force applied by the appendage to a surface and the received light, the computed correlation based at least in part on the sensed first light level and the sensed second light level.

In some embodiments, calibration can further comprise sensing an ambient light level while the light generation device is not generating any light, and the computing the correlation can further be based at least in part on the sensed ambient light. In some embodiments, the determining the amount of force applied to the surface can further comprise computing the amount of force based at least in part on the computed correlation. In some embodiments, the appendage is a finger and the finger is in an uncompressed state when not pressed against any surface, and is in a compressed state when pressed against a surface.

BRIEF DESCRIPTION OF THE DRAWINGS

Embodiments of the present invention will be described and explained through the use of the accompanying drawings in which.

DETAILED DESCRIPTION

Figure 1:
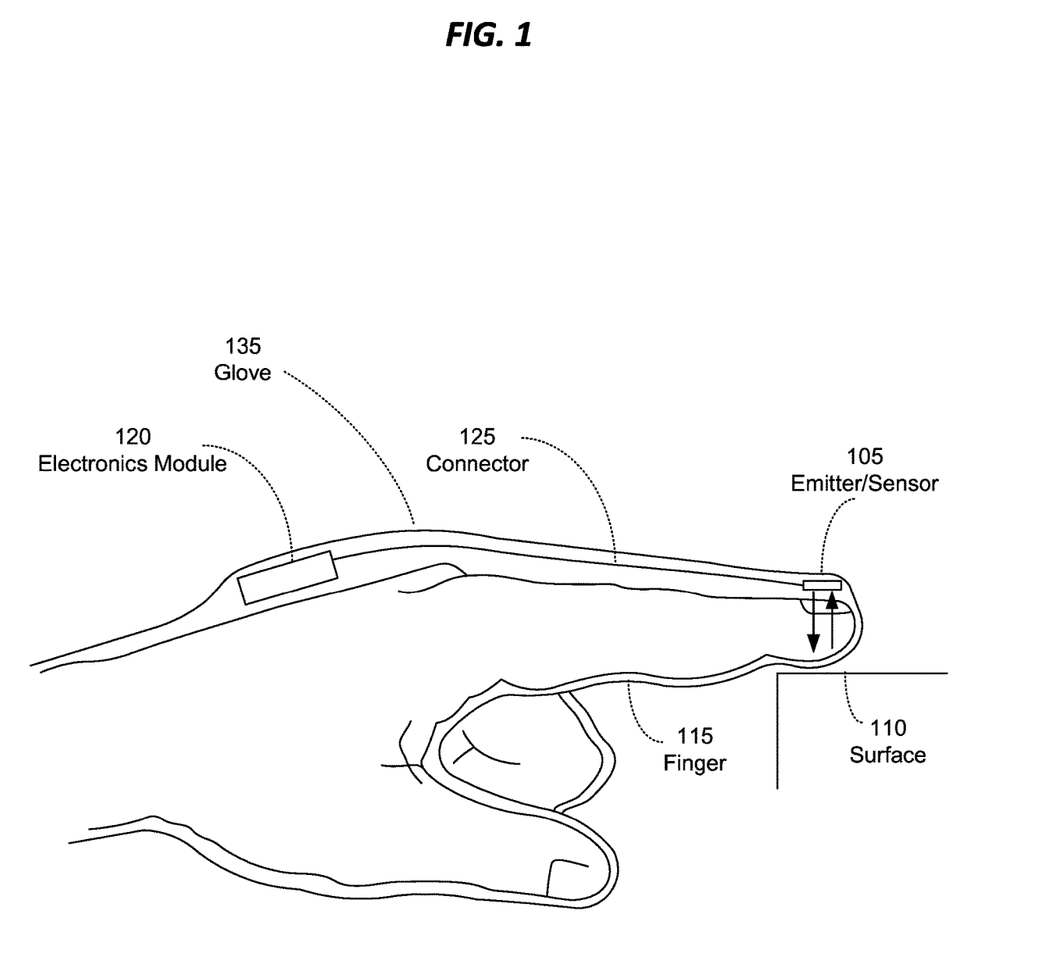
FIG. 1 illustrates a first apparatus to detect force applied by a finger using light sent through the finger.

FIG. 1 illustrates an apparatus to detect force applied by a finger using light sent through the finger. As illustrated in FIG. 1, the apparatus includes emitter/sensor 105, electronics module 120, connector 125, and glove 135. Electronics module 120 provides power to and communicates with emitter/sensor 105 via connector 125. An emitter/sensor can be an integrated package of two devices, typically infrared light-emitting diodes (LEDs), or independent devices separately connected.

Glove 135 can provide mechanical support for any of electronics module 120, emitter/sensor 105, and connector 125, which can all be attached to glove 135 so they will remain with glove 135 when removed from a hand. Further, putting glove 135 on a hand can position electronics module 120, emitter/sensor 105, and connector 125 at appropriate locations on the hand. Connector 125 can be two sets of wires, one set of wires coupling electronics module 120 to the emitter portion of emitter/sensor 105 or to a separate emitter, such as emitter 305 of FIG. 3. And a second set of wires coupling electronics module 120 to the sensor portion of emitter/sensor 105, or to a separate sensor, such as sensor 310 of FIG. 3. The emitter and sensor can be infrared LEDs set to an appropriate mode.

Transmission of light through living tissue, such a finger, is affected by how much the tissue is compressed. The tissue of the finger may be compressed, for example, by being pressed onto a surface. This change in light transmission may be used as an indirect way to measure how much force is being applied to the surface by the finger.

There are at least two methods of sending light through tissue, the transmission method and the reflectance method. Sending light can include transmitting light, guiding light, conveying light, emitting light, reflecting light, and/or carrying light. In the transmission method, the emitter and sensor are placed on different locations on the skin with the tissue in between. The emitter can emit and send light into the tissue at one point on the skin, the light passes through the tissue, and the sensor can receive the light exiting the tissue at a second different point on the skin. In the reflectance method, light emitted by the emitter is reflected and scattered, and the sensor senses primarily this reflected and scattered light rather than light passing directly through the tissue. For example, light from an emitter can enter the tissue. The tissue and the skin on the other side of the tissue can reflect and/or scatter the light. The sensor can be placed such that it receives primarily the scattered and reflected light. One example of a placement where the sensor would utilize the reflectance method would be if the emitter and sensor were both placed at adjacent locations on the skin or fingernail of a finger.

FIG. 1 illustrates an apparatus that uses primarily the reflectance method. Electronics module 120 can cause the emitter portion of emitter/sensor 105 to emit and send light into finger 115, thereby introducing the light into finger 115. Introducing light into a finger can include sending the light into the finger and/or causing the light to enter the finger. Upon entering finger 115, the light from emitter/sensor 105 is scattered and reflected, and a portion of the light exits finger 115 and is received by the sensor portion of emitter/sensor 105. Emitter/sensor 105 communicates the sensor readings to electronics module 120. Electronics module 120 includes a processor coupled to memory, in some embodiments the memory being non-volatile memory such as flash memory. The processor can use the readings from emitter/sensor 105, along with other information, to determine the compression of finger 115 and the associated force applied to surface 110.

Living tissue has optical properties which are defined by varying rates of absorption, attenuation, scattering, transmission, and reflection. Different imaging techniques, such as optical coherence tomography (OCT), laser Doppler flowmetry (LDF), and transmissive laser speckle imaging (TLSI), rely upon an understanding of these complex optical properties. The transmission of light into and through living tissue can depend on parameters such as the wavelength, intensity, and polarization of the light, the coherence of the light source, and the tissue compression, among others. The transmission can further depend on parameters and features of the tissues, such as pigmentation, fibrotic structure, hydration, composition, thickness, and the surges in blood flow associated with heartbeats. The transmission can additionally depend on external factors such as the location of the light emitter and sensor relative to the tissue, and the presence and characteristics of hair and clothing.

The light emitter and sensor can utilize various wavelengths of light, and even multiple wavelengths of light. An advantageous aspect of infrared wavelengths is that they do not create distracting visible light in dark environments. In some embodiments, the emitter portion of emitter/sensor 105 emits and sends light of one wavelength, and the sensor portion of emitter/sensor 105 detects light of this same wavelength. As previously discussed, the characteristics of light sent into and through tissue, such as into and through finger 115, is affected by the tissue compression. For example, the transmission or attenuation of light through finger 115 can be affected by the tissue compression of finger 115. Because of these effects of tissue compression, one or more of the characteristics of the light that passes through finger 115, as determined using the readings of emitter/sensor 105, can be used to determine the tissue compression of finger 115.

In some embodiments, the emitter portion of emitter/sensor 105 emits and sends light of multiple wavelengths, and the sensor portion of emitter/sensor 105 detects light of these same multiple wavelengths. In some embodiments, multiple emitters and sensors are used, with each emitter and sensor pair emitting/sending and receiving the same wavelength of light, the wavelength being different from other emitter sensor pairs. In these multiple wavelength embodiments, in addition to using the one or more characteristics of the light as is discussed above, the ratio between these one or more characteristics of the light at these multiple wavelengths can be used to calculate the tissue compression of finger 115. For example, if emitter/sensor 105 emits both red and infrared light and sends the light into tissue, the ratio of one or more characteristics of this light upon exit from the tissue, such as the transmission or attenuation though the tissue, can be determined. Using data captured by emitter/sensor 105, the transmission and attenuation of both the red light and the infrared light exiting the tissue can be determined. The ratio of the two transmission values, or of the two attenuation values, can be determined and used to determine the compression of the tissue of finger 115.

Figure 2:
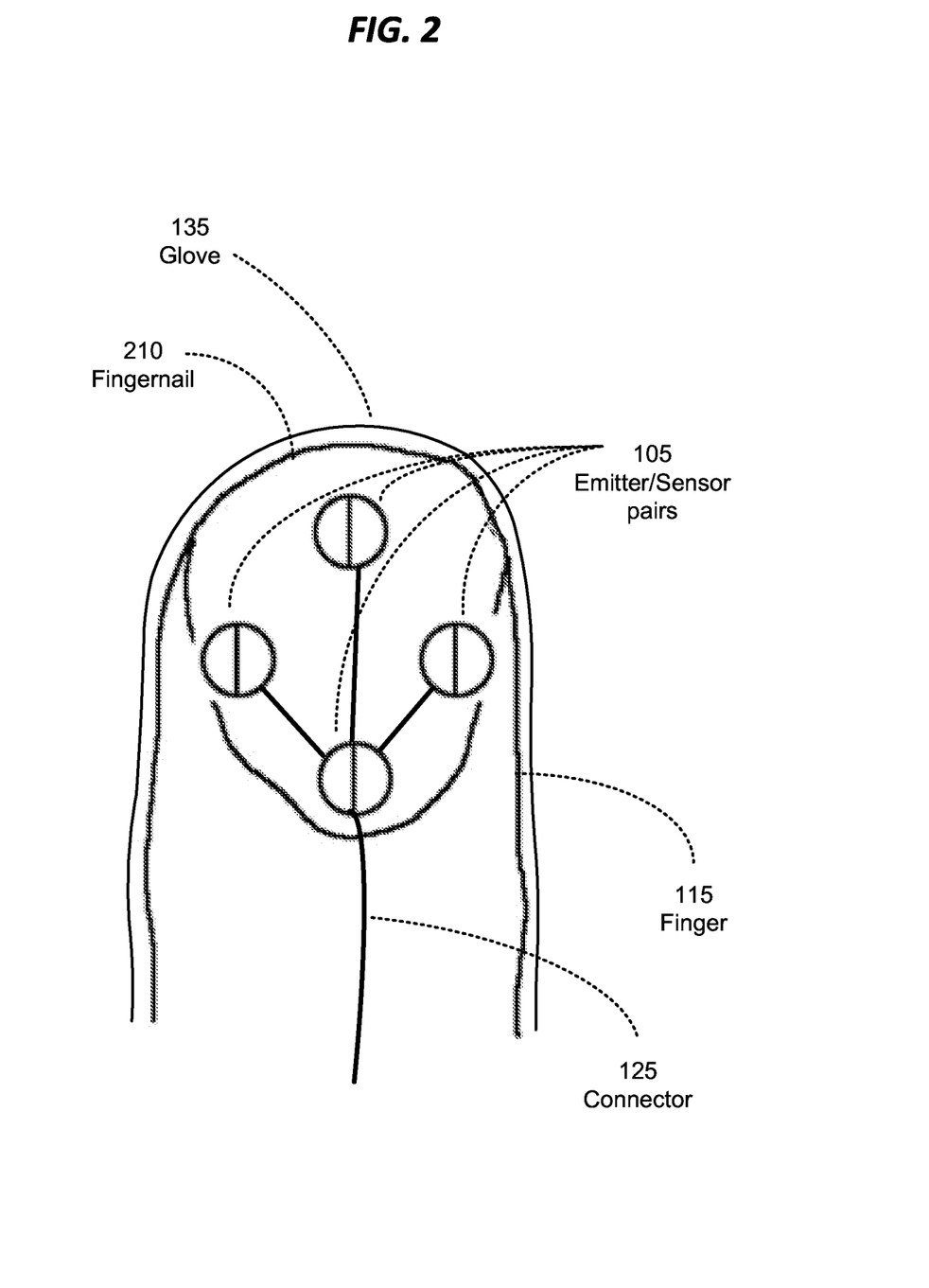
FIG. 2 illustrates emitter/sensor pairs located on a fingernail.

FIG. 2 illustrates emitter/sensor pairs 105 located over a fingernail 210. When using an emitter/sensor, the method of receiving light through the tissue is primarily the reflectance method, which is discussed above relative to FIG. 1. Several emitters/sensor pairs 105 may be mounted in a pattern on the fingertip to sense two or more degrees of freedom with the effect of a virtual joystick, for example side-to-side and fore-and-aft movement. In some embodiments, to avoid interference, each emitter/sensor pair can use unique frequencies of light. In some embodiments, each emitter may send a short-duration light pulse in turn, with sufficient time between the pulses so that the light pulse from each emitter is reflected and received by its paired sensor before the light pulse from the next emitter is generated. Four pairs are sufficient to detect two degrees of freedom, and more may be fitted for higher accuracy. In some embodiments, a single sensor can be shared between several emitters, detecting the pulse from each emitter in turn. The emitter/sensor pairs are coupled to electronics module 120 via connector 125.

Figure 3:
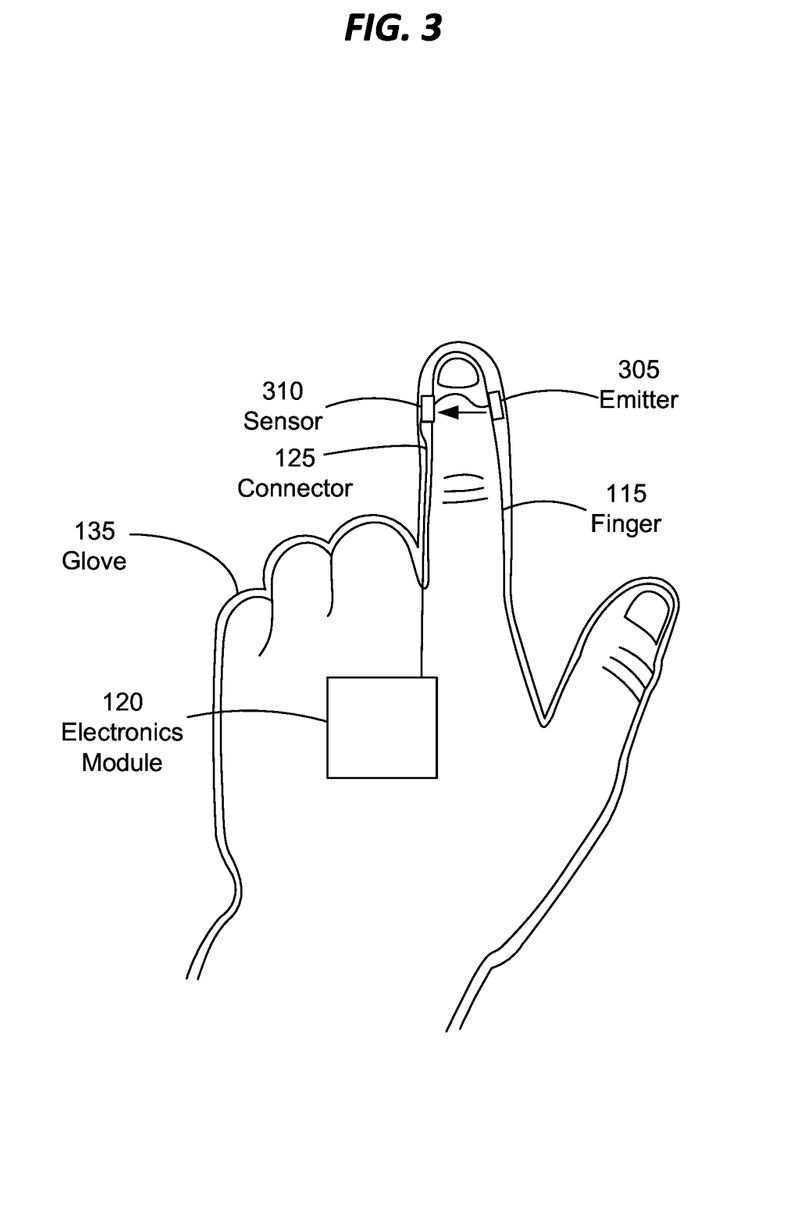
FIG. 3 illustrates an emitter sending light through a finger to a sensor.

FIG. 3. illustrates an emitter sending light through a finger to a sensor. In this embodiment, emitter 305 and sensor 310 are separate components. The previously discussed transmission method is the primary method of sending light through the tissue in this embodiment. Electronics module 120 is coupled to emitter 305 and sensor 310 by connector 125. Electronics module 120 provides power to and communicates with emitter 305 and sensor 310 via connector 125.

Electronics module 120 can cause emitter 305 to emit and send light into finger 115. Upon entering finger 115, a portion of the light from emitter 305 is scattered and reflected, and some of the scattered and reflected light exits finger 115 and is received by sensor 310. Another portion of the light that enters finger 115 passes through finger 115 via the previously discussed transmission method and is received by sensor 310. Sensor 310 communicates the sensor readings to electronics module 120. Electronics module 120 includes a processor which can use the readings from sensor 310, along with other information, to determine the compression of finger 115 and the associated force applied to a surface.

Figure 4A:
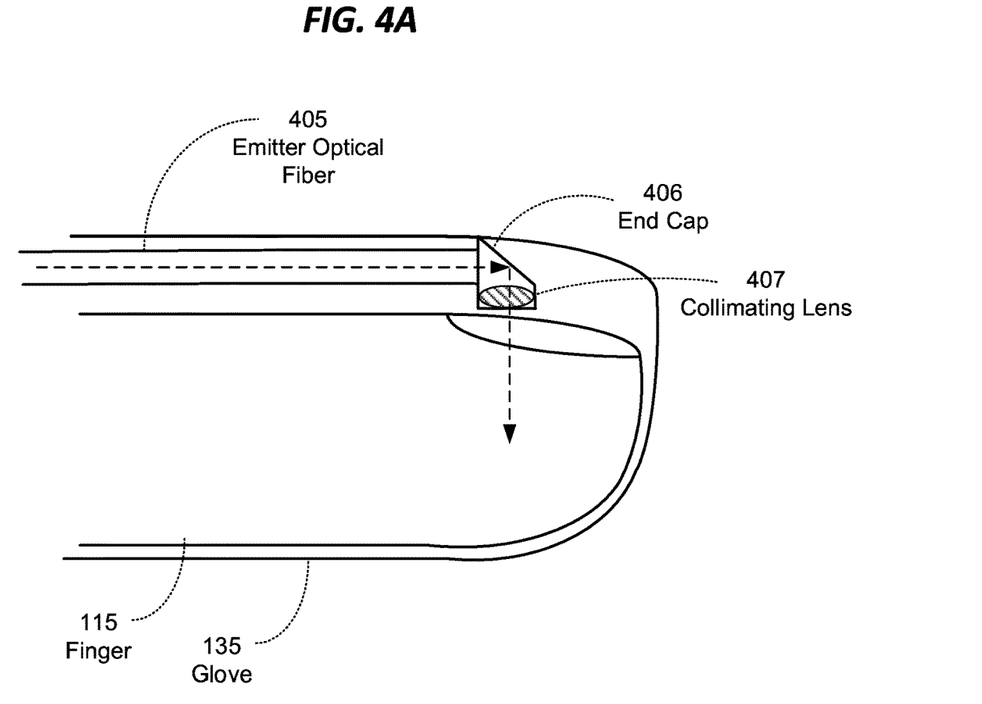
FIG. 4A illustrates an optical fiber used to send light from a light source into a finger.
Figure 4B:
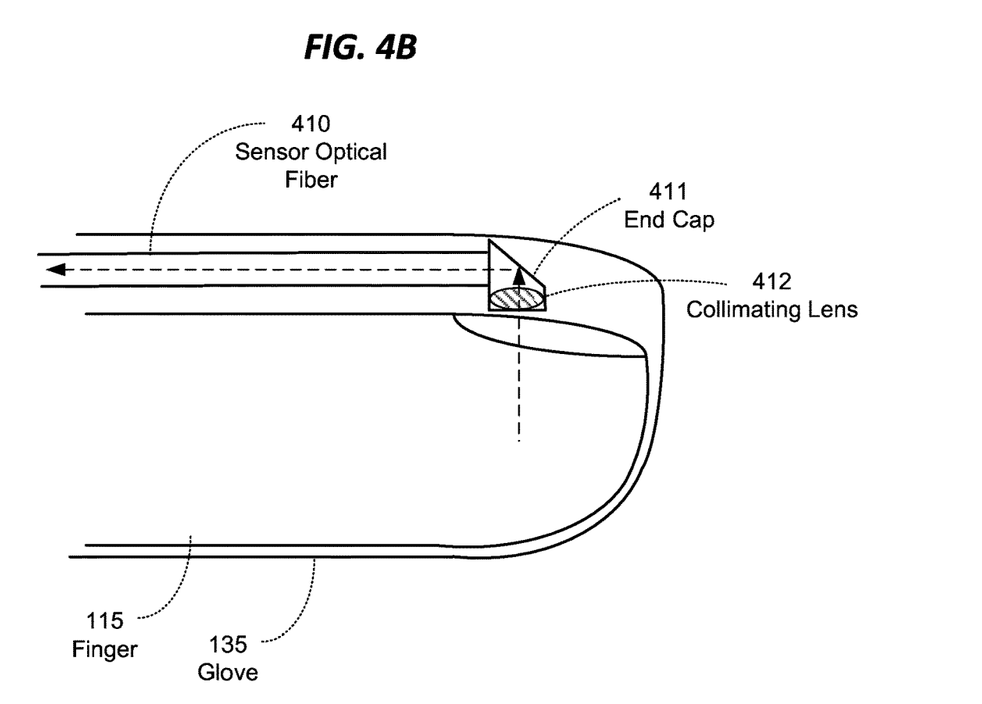
FIG. 4B illustrates an optical fiber used to send light exiting a finger to a light sensor.
Figure 5:
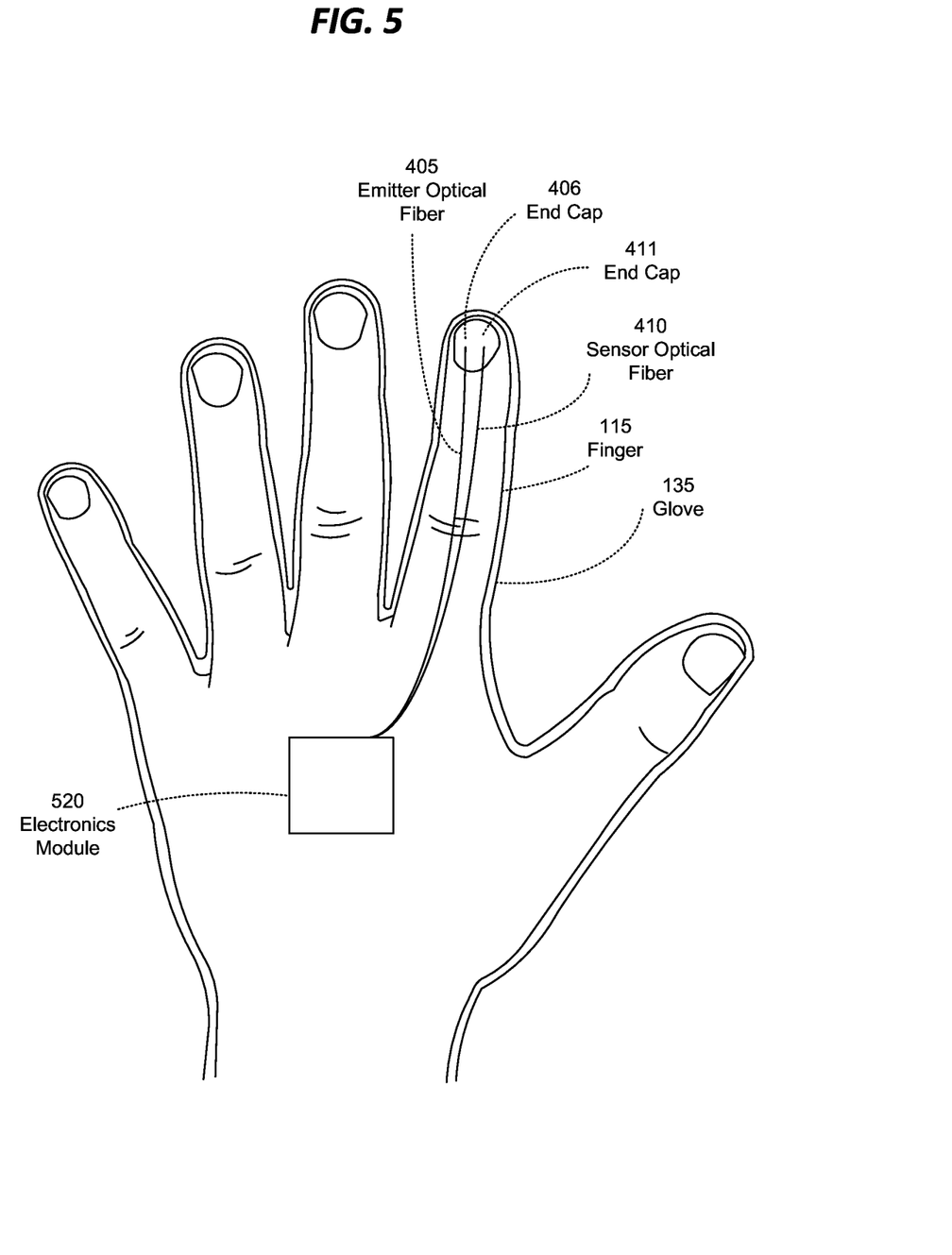
FIG. 5 illustrates a second apparatus to detect force applied by a finger using light sent through the finger.

FIG. 4A illustrates an optical fiber used to send light from a light source into a finger. Light sources can include light generation sources and/or light generation devices, among others. In FIGS. 1-3, the light source is located at the point of entry of the light into finger 115. In the embodiment of FIG. 4, the light source is not located at the point of entry but is located remotely, for example in electronics module 520 as illustrated in FIG. 5. An advantageous aspect of this configuration is that all electrical elements may be contained within a sealed compartment, such as within electronics module 520. The light is sent from the light source to the point of entry of the light into finger 115 through emitter optical fiber 405. The end of emitter optical fiber 405 is fitted into end cap 406 with collimating lens 407 and an angled reflective surface, such that the light exiting the fiber is directed into finger 115 at the desired angle, typically 90 degrees. However, a person having ordinary skill in the art will appreciate that the apparatus of FIG. 4A and FIG. 4B can work with many angles. In some embodiments, the tip of the optical fiber may simply be turned through 90 degrees towards the finger surface and mechanically held in place.

FIG. 4B illustrates an optical fiber used to send light exiting a finger to a light sensor. In FIGS. 1-3, the light sensor is located at the point of exit of the light from finger 115. In the embodiment of FIG. 4B, the light sensor is remotely located, for example in electronics module 520 as illustrated in FIG. 5. The light is sent from the point of exit from finger 115 through sensor optical fiber 410 to the light sensor at the other end of sensor optical fiber 410. The end of sensor optical fiber 410 is fitted into end cap 411 with collimating lens 412 and an angled reflective surface, typically angled at 45 degrees relative to the fiber axis, to turn the received light 90 degrees into the end of sensor optical fiber 410. In some embodiments, the tip of the optical fiber may simply be turned through 90 degrees towards the finger surface and mechanically held in place.

FIG. 5 illustrates a second apparatus to detect force applied by a finger using light sent through the finger. In this embodiment, the light source and light sensor are located in electronics module 520 and are coupled to a processor. The processor can cause the light source to generate light, and the generated light can enter emitter optical fiber 405, where the fiber is either turned or the light reflected off an angled surface such that the light is sent into finger 115 approximately perpendicular to the surface. Some of the light from the light source that enters finger 115 exits finger 115 and is received by sensor optical fiber 410.

The end of sensor optical fiber 410 is fitted into an end cap 411 containing a collimating lens and angled surface, such that received light is reflected down sensor optical fiber 410 towards the light sensor located in electronics module 520. The angled surface in end cap 411 is typically set for 45 degrees, such that light is reflected through a 90 degree angle. However, a person having ordinary skill in the art will appreciate that the apparatus of FIGS. 4A and 4B can work with many angles. In some embodiments, the tip of the optical fiber may simply be turned 90 degrees towards the finger surface and mechanically held in place.

Figure 6:
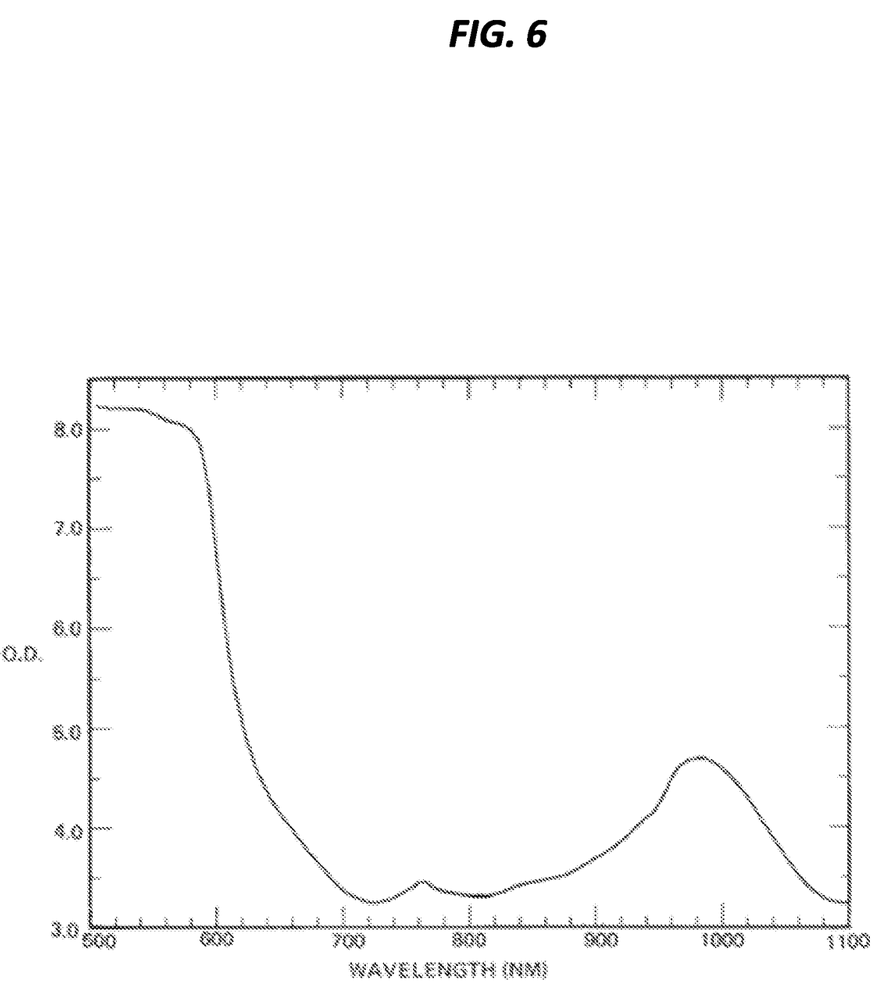
FIG. 6 is a graph of the Optical Density of a human hand versus the wavelength of the light.

FIG. 6 graphically illustrates the Optical Density of a human hand versus the wavelength of the light. The Y-axis of this graph is the Optical Density, which reflects the transmission of light through a human hand. For example, an Optical Density of 3.5 corresponds to a percent transmission of light of about 0.5%. The X-axis of this graph is the wavelength of the light. As can be seen from the graph of FIG. 6, the best transmission through a hand is approximately between light wavelengths of 670 nm and 910 nm, and then from 1050 nm and up.

Figure 7:
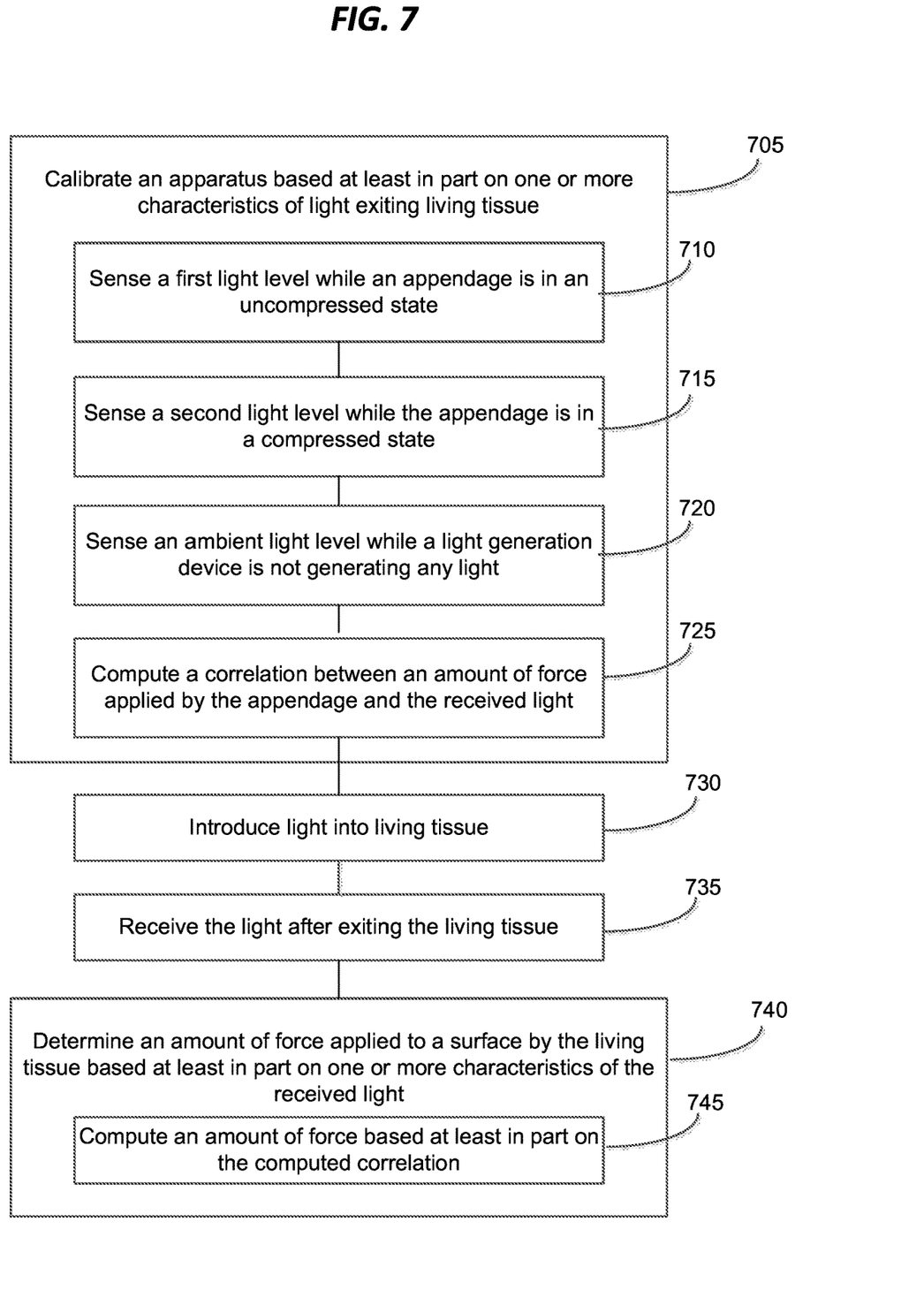
FIG. 7 is a flow chart illustrating exemplary operations for determining an amount of force applied by living tissue to a surface.

FIG. 7 is a flow chart illustrating exemplary operations for determining an amount of force applied by living tissue to a surface. In accordance with some embodiments of the present invention, the method illustrated in FIG. 7 can be performed using many embodiments, including the embodiment illustrated in FIG. 1 and the embodiment illustrated in FIG. 5. The following description of FIG. 7 will be described with the method applied to the embodiments illustrated in FIGS. 1 and 5. This is done with the intent of making the description of the method easier to follow.

Step 705 calibrates an apparatus based at least in part on one or more characteristics of light exiting living tissue. Steps 710, 715, 720, and 725 are one set of steps that perform the calibration of step 705.

Step 710 senses a first light level while an appendage is in an uncompressed state. Using the embodiment of FIG. 1 as an example, finger 115 can be the appendage. FIG. 1 depicts finger 115 in an uncompressed state, as finger 115 is not touching surface 110. The emitter portion of emitter/sensor 105, controlled by electronics module 120, emits and sends light into finger 115. Some of the light from emitter/sensor 105, after entering and exiting finger 115, is received and sensed by the sensor portion of emitter/sensor 105. The sensor portion of emitter/sensor 105 senses a first light level while finger 115 is in the uncompressed state.

Using the embodiment of FIG. 5 as a second example, finger 115 can be the appendage. FIG. 5 depicts finger 115 in an uncompressed state, as finger 115 is not pressing a surface. A light source that is part of electronics module 520 can generate light and send the light into one end of emitter optical fiber 405, which can send the light to the other end of the fiber. The light can enter end cap 406 of emitter optical fiber 405, where it is reflected and sent into finger 115. Some of the light from the light source, after entering and exiting finger 115, is received by sensor optical fiber 410 at end cap 411 and can be sent to a sensor via sensor optical fiber 410. The sensor can sense a first light level while finger 115 is in the uncompressed state.

Step 715 senses a second light level while the appendage is in a compressed state. Using the embodiment of FIG. 1 as an example, finger 115 can be the appendage. FIG. 1 depicts finger 115 in an uncompressed state, as finger 115 is not touching surface 110. When finger 115 touches and presses on surface 110, it is in a compressed state, as the pressure exerted by finger 115 on surface 110 causes the tissue at the finger tip of finger 115 to compress. The emitter portion of emitter/sensor 105, controlled by electronics module 120, emits and sends light into finger 115. Some of the light from emitter/sensor 105, after entering and exiting finger 115, is received and sensed by the sensor portion of emitter/sensor 105. The sensor portion of emitter/sensor 105 senses a second light level while finger 115 is in the compressed state.

Using the embodiment of FIG. 5 as a second example, finger 115 can be the appendage. FIG. 5 depicts finger 115 in an uncompressed state, as finger 115 is not touching any surface. When finger 115 touches and presses on a surface, it is in a compressed state, as the pressure exerted by finger 115 on the surface causes the tissue at the finger tip of finger 115 to compress. A light source controlled by the processor of electronics module 520 can generate light and send the light into one end of emitter optical fiber 405, which can send the light to the other end of the fiber. The light can enter end cap 406 of emitter optical fiber 405, where it is reflected and sent into finger 115. Some of the light from the light source, after entering and exiting finger 115, is received by sensor optical fiber 410 at end cap 411 and can be sent to the light sensor of electronics module 520 via sensor optical fiber 410. The light sensor can sense a second light level while finger 115 is in the compressed state.

Step 720 senses an ambient light level while a light generation device is not generating any light. Using the embodiment of FIG. 1 as an example, finger 115 can be the appendage. The emitter portion of emitter/sensor 105, controlled by the processor of electronics module 120, is turned off and is not sending any light into finger 115. The sensor portion of emitter/sensor 105 senses an ambient light level while the emitter portion of emitter/sensor 105 is turned off.

Using the embodiment of FIG. 5 as a second example, finger 115 can be the appendage. A light source controlled by the processor of electronics module 520 is turned off and is not sending any light into emitter optical fiber 405. No light from the light source is sent from emitter optical fiber 405 into finger 115. Ambient light is received by sensor optical fiber 410 at end cap 411 and can be sent to a light sensor via sensor optical fiber 410. The light sensor can sense an ambient light level while the light source is turned off.

Step 725 computes a correlation between an amount of force applied by the appendage and the received light. Using the embodiment of FIG. 1 as an example, electronic module 120 can include a processor coupled to memory. The one or more characteristics of light exiting the living tissue can be a light level sensed by the sensor portion of emitter/sensor 105, the sensed light generated and emitted by the emitter portion of emitter/sensor 105. The processor can compute a function, such as a curve, to estimate an amount of force applied by finger 115 based on two or more of the light levels, also referred to as light intensities, sensed during steps 710, 715, and 720. The processor, configured to perform step 725 via instructions stored in the memory, the instructions containing information regarding the amount of force applied by finger 115 during steps 710, 715, and 720, can use this amount of force applied by finger 115 information and the light intensities sensed during steps 710, 715, and 720 to compute a function approximating the force applied by finger 115.

Step 730 introduces light into living tissue. Using the embodiment of FIG. 1 as an example, the living tissue can be finger 115. An emitter, such as the emitter portion of emitter/sensor 105 controlled by electronics module 120, emits and sends light into finger 115, thereby introducing the light into the living tissue of finger 115. Using the embodiment of FIG. 5 as a second example, the living tissue can be finger 115. A light source controlled by the processor of electronics module 520 can generate light and send the light into one end of emitter optical fiber 405. The light can be sent from the light source end of emitter optical fiber 405 to the end cap 406 end of the fiber, where the light is reflected and sent into finger 115, thereby introducing the light into the living tissue of finger 115.

Step 735 receives light exiting the living tissue. Using the embodiment of FIG. 1 as an example, the living tissue can be finger 115. The emitter portion of emitter/sensor 105, controlled by the processor of electronics module 120, emits light into finger 115. Some of the emitted light, after entering and exiting finger 115, is received and sensed by the sensor portion of emitter/sensor 105. The sensor portion of emitter/sensor 105 receives the light exiting the living tissue.

Using the embodiment of FIG. 5 as a second example, the living tissue can be finger 115. A light source controlled by the processor of electronics module 520 can generate light and send the light into one end of emitter optical fiber 405, which can send the light to the other end of the fiber. The light can enter end cap 406 of emitter optical fiber 405, where it is reflected and sent into finger 115. Some of the light from the light source, after entering and exiting finger 115, is received by sensor optical fiber 410 at end cap 411 and can be sent to a light sensor via sensor optical fiber 410. End cap 411 of sensor optical fiber 410 receives the light exiting the living tissue.

Step 740 determines an amount of force applied to a surface by the living tissue based at least in part on one or more characteristics of the received light. The one or more characteristics of the received light can include an intensity of the received light. Step 745 is one step that can perform the determination of step 750. When step 745 computes an amount of force, step 745 also determines an amount of force.

Step 745 computes an amount of force based at least in part on the computed correlation. Using the embodiment of FIG. 1 as an example, electronics module 120 can include a processor coupled to memory. The computed correlation can be the computed correlation of step 725. The sensor portion of emitter/sensor 105 at step 735 can receive and sense the intensity of the light. The processor can determine the amount of force applied by finger 115 based on the sensed intensity of the light by computing the amount of force based at least in part on the computed correlation of step 725.

Using the embodiment of FIG. 5 as a second example, the processor of electronics module 520 is coupled to optical emitter fiber 405 and sensor optical fiber 410 (i.e., the processor is coupled to a light source which is coupled to emitter optical fiber 405, therefore the processor is coupled to emitter optical fiber 405 via the light source). The computed correlation can be the computed correlation of step 725. End cap 411 of sensor optical fiber 410 receives the light exiting the living tissue and sends the light to a light sensor, which receives the light and senses the intensity of the light. The processor can determine the amount of force applied by finger 115 based on the sensed intensity of the light by computing the amount of force based at least in part on the computed correlation of step 725.

Although the present invention is described herein with reference to the preferred embodiment, one skilled in the art will readily appreciate that other applications may be substituted for those set forth herein without departing from the spirit and scope of the present invention. Accordingly, the present invention should only be limited by the Claims included below.

What is claimed is:

1. An apparatus configured to determine an amount of force on a tissue, the apparatus comprising:
   an optical fiber including a first end and a second end;
   an electronics module coupled to the first end of the optical fiber, the electronics module including:
   a light emitter configured to provide light transmitted over the optical fiber to the tissue;
   a light sensor configured to receive light communicated over the optical fiber, the received light corresponding to a portion of the transmitted light reflected from within the tissue; and
   a processor configured to determine the amount of force on the tissue based on one or more characteristics of the received light; and
   an end cap coupled to the second end of the optical fiber, the end cap being configured to introduce the transmitted light into the tissue and receive the light reflected from within the tissue.

2. The apparatus of claim 1, wherein the one or more characteristics of the received light includes an intensity of the received light.

3. The apparatus of claim 1, wherein the end cap comprises:
   a collimating lens configured to introduce the light into the tissue and receive the light reflected from within the tissue.

4. The apparatus of claim 1, wherein the end cap comprises:
   a reflective element configured to change an angle of the transmitted light and change an angle of the reflected light communicated between the electronics module and the tissue.

5. The apparatus of claim 1, wherein the electronics module is remotely located from the end cap.

6. The apparatus of claim 1 further comprising:
   a glove configured to cover the tissue while mechanically supporting the optical fiber and mechanically supporting the end cap on a surface of the tissue.

7. An apparatus configured to determine an amount of force on a tissue, the apparatus comprising:
   an optical fiber including a first end and a second end;
   an end cap coupled to the first end of the optical fiber, the end cap including:
   a reflective element configured to communicate light between the optical fiber and tissue on which the end cap is disposed; and
   a lens configured to transmit light into the tissue and receive light reflected from within the tissue; and
   an electronics module coupled to the second end of the optical fiber, the electronics module being configured to determine an amount of force on the tissue based on the received light delivered to the electronics module over the optical fiber.

8. The apparatus of claim 7, wherein the lens includes a collimating lens.

9. The apparatus of claim 7, wherein the end cap includes only passive components.

10. The apparatus of claim 7, wherein the tissue is a human finger, the apparatus further comprising:
   a glove configured to cover the human finger and mechanically supporting the optical fiber and the end cap.

11. A method performed by an apparatus for determining an amount of force on a tissue, the method comprising:
   transmitting light through an entry point into the tissue, the transmitted light being communicated over an optical system from a remotely located light source;
   receiving light exiting the tissue, the received light including a portion of the transmitted light reflected by the tissue; and
   determining an amount of force on the tissue based on one or more characteristics of the received light.

12. The method of claim 11, wherein the received light is communicated over an optical fiber to a light sensor of an electronics module, the electronics module determining the amount of force on the tissue based on the received light.

13. The method of claim 11, wherein the received light is transmitted through the entry point and communicated over the optical system to a light sensor of an electronics module, the electronics module including the light source and a processor configured to determine the amount of force on the tissue.

14. The method of claim 11 further comprising, after communicating the transmitted light over the optical system from the remotely located light source:
   redirecting the transmitted light from a first direction to a second direction prior to being transmitted into the tissue.

15. The method of claim 11, wherein the light transmitted into the tissue and the light reflected by the tissue are communicated over an optical fiber that is mechanically supported by a glove covering the tissue.

16. The method of claim 11, wherein the tissue is of a human finger.

17. The method of claim 11, wherein the tissue is of a finger, and some of the transmitted light, after entering the finger and exiting as the received light, is received by a light sensor that is located remotely from the finger.

18. The method of claim 11 further comprising, prior to determining the amount of force on the tissue:
   turning off the light source that emits the transmitted light into the tissue; and
   sensing the received light by a light sensor while the light source is turned off.

19. The method of claim 11, wherein the tissue is of a finger, the optical system includes an optical fiber, and the optical fiber communicates the transmitted light to an end cap disposed on the finger, the end cap introducing the light into the tissue.

20. The method of claim 11 further comprising, prior to transmitting light through the entry point into the tissue:
   generating the transmitted light by the light source under control by a processor of an electronics module; and
   sending the transmitted light over the optical system to a passive optical element disposed on a surface of the tissue.

* * * * *